(12) United States Patent
Smith et al.

(10) Patent No.: US 8,566,188 B2
(45) Date of Patent: Oct. 22, 2013

(54) SYSTEMS AND METHODS TO ROUTE MESSAGES TO FACILITATE ONLINE TRANSACTIONS

(75) Inventors: Glyn Barry Smith, Chesterfield (GB); Ron Hirson, San Francisco, CA (US)

(73) Assignee: Boku, Inc., San Francisco, CA (US)

( * ) Notice: Subject to any disclaimer, the term of this patent is extended or adjusted under 35 U.S.C. 154(b) by 302 days.

(21) Appl. No.: 12/687,075

(22) Filed: Jan. 13, 2010

(65) Prior Publication Data

US 2011/0173106 A1  Jul. 14, 2011

(51) Int. Cl.
G07F 19/00 (2006.01)
H04M 3/42 (2006.01)

(52) U.S. Cl.
USPC .......................... 705/34; 455/414.1

(58) Field of Classification Search
USPC ............................................ 705/24
See application file for complete search history.

(56) References Cited

U.S. PATENT DOCUMENTS

| | | | |
|---|---|---|---|
| 5,283,829 A | 2/1994 | Anderson | |
| 5,708,422 A | 1/1998 | Blonder et al. | |
| 5,905,873 A * | 5/1999 | Hartmann et al. | 709/249 |
| 5,914,472 A | 6/1999 | Foladare et al. | |
| 5,953,710 A | 9/1999 | Fleming | |
| 6,282,276 B1 | 8/2001 | Felger | |
| 6,302,326 B1 | 10/2001 | Symonds et al. | |
| 6,473,808 B1 | 10/2002 | Yeivin et al. | |
| 6,612,488 B2 | 9/2003 | Suzuki | |
| 6,704,409 B1 | 3/2004 | Dilip et al. | |
| 6,718,178 B1 | 4/2004 | Sladek et al. | |
| 6,788,771 B2 | 9/2004 | Manto | |
| 6,807,410 B1 | 10/2004 | Pailles et al. | |
| 6,928,558 B1 | 8/2005 | Allahwerdi et al. | |
| 6,965,872 B1 | 11/2005 | Grdina | |
| 6,996,409 B2 | 2/2006 | Gopinath et al. | |
| 7,013,125 B2 | 3/2006 | Henrikson | |
| 7,080,049 B2 | 7/2006 | Truitt et al. | |

(Continued)

FOREIGN PATENT DOCUMENTS

| | | |
|---|---|---|
| GB | 2379525 | 3/2003 |
| JP | 2007109014 | 4/2007 |

(Continued)

OTHER PUBLICATIONS

"Electronic Payment Authorization", GB 2 379 525 (Application No. 01217892), Published: Mar. 13, 2003 to Downning et al.*

(Continued)

*Primary Examiner* — Garcia Ade
(74) *Attorney, Agent, or Firm* — Stephen M. De Klerk

(57) ABSTRACT

Systems and methods are provided to facilitate online transactions via mobile communications. In one aspect, a system includes a data storage facility to store an account and a phone number associated with the account and an interchange coupled with the data storage facility. The interchange includes a common format processor and a plurality of converters to interface with a plurality of different controllers of mobile communications. The converters are configured to communicate with the controllers in different formats and to communicate with the common format processor in a common format. The common format processor is to select a first controller based at least in part on reducing cost, and to instruct the first controller of the controllers, via a first converter of the converters, to transmit a first message to a mobile device at the phone number to facilitate a transaction related to funds associated with the phone number.

20 Claims, 11 Drawing Sheets

(56) References Cited

U.S. PATENT DOCUMENTS

| | | |
|---|---|---|
| 7,089,208 B1 | 8/2006 | Levchin et al. |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,386,477 B2 | 6/2008 | Fano |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,527,192 B1 | 5/2009 | Chaskin et al. |
| 7,660,772 B2 | 2/2010 | Verkama |
| 7,752,135 B2 | 7/2010 | Brown et al. |
| 7,792,518 B2 | 9/2010 | Trioano et al. |
| 7,848,500 B2 | 12/2010 | Lynam et al. |
| 7,848,980 B2 | 12/2010 | Carlson |
| 7,870,044 B2 | 1/2011 | Robertson |
| 7,870,077 B2 | 1/2011 | Woo et al. |
| 7,873,573 B2 * | 1/2011 | Realini ............................ 705/39 |
| 7,890,433 B2 | 2/2011 | Singhal |
| 8,073,774 B2 * | 12/2011 | Pousti ............................ 705/40 |
| 8,116,730 B2 | 2/2012 | Smith |
| 8,245,044 B2 | 8/2012 | Kang |
| 2001/0003093 A1 | 6/2001 | Lundin |
| 2001/0037264 A1 | 11/2001 | Husemann et al. |
| 2002/0004751 A1 | 1/2002 | Seki et al. |
| 2002/0013727 A1 | 1/2002 | Lee |
| 2002/0016769 A1 | 2/2002 | Barbara et al. |
| 2002/0017561 A1 | 2/2002 | Tomoike |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0111908 A1 | 8/2002 | Milberger et al. |
| 2002/0120582 A1 | 8/2002 | Elston et al. |
| 2002/0193094 A1 | 12/2002 | Lawless et al. |
| 2003/0023505 A1 | 1/2003 | Eglen et al. |
| 2003/0065525 A1 | 4/2003 | Giachhetti et al. |
| 2003/0119478 A1 | 6/2003 | Nagy et al. |
| 2003/0125969 A1 | 7/2003 | Kizer et al. |
| 2003/0126076 A1 | 7/2003 | Kwok |
| 2003/0212601 A1 | 11/2003 | Silva et al. |
| 2004/0019564 A1 | 1/2004 | Goldthwaite et al. |
| 2004/0044582 A1 | 3/2004 | Chowdhary |
| 2004/0122685 A1 | 6/2004 | Bunce |
| 2004/0185827 A1 | 9/2004 | Parks |
| 2004/0230527 A1 | 11/2004 | Hansen et al. |
| 2004/0248596 A1 | 12/2004 | Panchal |
| 2004/0252814 A1 | 12/2004 | Eakin |
| 2005/0055296 A1 | 3/2005 | Hattersley et al. |
| 2005/0055309 A1 | 3/2005 | Williams et al. |
| 2005/0086164 A1 | 4/2005 | Kim et al. |
| 2005/0177442 A1 | 8/2005 | Sullivan et al. |
| 2005/0177517 A1 | 8/2005 | Leung et al. |
| 2005/0197892 A1 | 9/2005 | Bilibin et al. |
| 2005/0199709 A1 | 9/2005 | Linlor |
| 2005/0245257 A1 | 11/2005 | Woodhill |
| 2006/0018450 A1 | 1/2006 | Sandberg-Diment |
| 2006/0121880 A1 * | 6/2006 | Cowsar et al. ................ 455/406 |
| 2006/0131390 A1 | 6/2006 | Kim |
| 2006/0206709 A1 | 9/2006 | Labrou et al. |
| 2006/0248011 A1 | 11/2006 | Hecht-Nielsen |
| 2006/0253335 A1 | 11/2006 | Keena et al. |
| 2006/0258331 A1 | 11/2006 | Syrett et al. |
| 2006/0259438 A1 | 11/2006 | Randle et al. |
| 2006/0276171 A1 | 12/2006 | Pousti |
| 2006/0294025 A1 | 12/2006 | Mengerink |
| 2007/0005467 A1 | 1/2007 | Haigh et al. |
| 2007/0011104 A1 | 1/2007 | Leger et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0063017 A1 | 3/2007 | Chen et al. |
| 2007/0094080 A1 | 4/2007 | Wiken |
| 2007/0118477 A1 | 5/2007 | Graves et al. |
| 2007/0123219 A1 | 5/2007 | Lovell, Jr. |
| 2007/0123229 A1 | 5/2007 | Pousti |
| 2007/0124490 A1 | 5/2007 | Kalavade et al. |
| 2007/0130025 A1 | 6/2007 | Nakajima |
| 2007/0130044 A1 | 6/2007 | Rowan |
| 2007/0133768 A1 | 6/2007 | Singh |
| 2007/0156517 A1 | 7/2007 | Kaplan et al. |
| 2007/0168462 A1 | 7/2007 | Grossberg |
| 2007/0175978 A1 | 8/2007 | Stambaugh |
| 2007/0198510 A1 | 8/2007 | Ebanks |
| 2007/0203792 A1 | 8/2007 | Rao |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tumminaro et al. |
| 2007/0250711 A1 | 10/2007 | Storey |
| 2007/0255653 A1 | 11/2007 | Tumminaro et al. |
| 2007/0255662 A1 | 11/2007 | Tumminaro et al. |
| 2007/0260556 A1 | 11/2007 | Pousti |
| 2007/0265921 A1 | 11/2007 | Rempe |
| 2007/0266034 A1 | 11/2007 | Pousti |
| 2007/0266130 A1 | 11/2007 | Mazur et al. |
| 2007/0270125 A1 | 11/2007 | Pousti |
| 2008/0009263 A1 | 1/2008 | Pousti |
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0082509 A1 | 4/2008 | Bessieres et al. |
| 2008/0091614 A1 | 4/2008 | Bas Bayod et al. |
| 2008/0097851 A1 | 4/2008 | Bemmel et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1 | 6/2008 | Carlson |
| 2008/0167017 A1 * | 7/2008 | Wentker et al. ............ 455/414.1 |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0275779 A1 | 11/2008 | Lakshminarayanan |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2009/0006184 A1 | 1/2009 | Leach et al. |
| 2009/0006217 A1 | 1/2009 | Smith |
| 2009/0006276 A1 | 1/2009 | Woolston |
| 2009/0024614 A1 | 1/2009 | Pousti |
| 2009/0029687 A1 | 1/2009 | Ramer et al. |
| 2009/0044216 A1 | 2/2009 | McNicoll |
| 2009/0055292 A1 | 2/2009 | Chong et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0081989 A1 | 3/2009 | Wuhrer |

(56) References Cited

U.S. PATENT DOCUMENTS

| | | |
|---|---|---|
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupali et al. |
| 2009/0281904 A1 | 11/2009 | Pharris |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057623 A1 | 3/2010 | Kapur et al. |
| 2010/0070757 A1 | 3/2010 | Martinez |
| 2010/0094732 A1 | 4/2010 | Smith |
| 2010/0106620 A1 | 4/2010 | Marcus |
| 2010/0114775 A1 | 5/2010 | Griffen |
| 2010/0125514 A1 | 5/2010 | Blackhurst et al. |
| 2010/0145802 A1 | 6/2010 | Nowacek et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223183 A1 | 9/2010 | Smith |
| 2010/0235276 A1 | 9/2010 | Smith |
| 2010/0250359 A1 | 9/2010 | Gillenson et al. |
| 2010/0250687 A1 | 9/2010 | Smith |
| 2010/0267362 A1 | 10/2010 | Smith et al. |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0125610 A1 | 5/2011 | Goodsall et al. |
| 2011/0143710 A1 | 6/2011 | Hirson |
| 2011/0143711 A1 | 6/2011 | Hirson |
| 2011/0287748 A1 | 11/2011 | Angel et al. |
| 2011/0295750 A1 | 12/2011 | Rammal |
| 2012/0171990 A1 | 7/2012 | Williams et al. |

FOREIGN PATENT DOCUMENTS

| | | |
|---|---|---|
| JP | 2007-179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO 2007004792 | 1/2007 |
| WO | WO-2007084593 | 7/2007 |
| WO | 2007102648 | 9/2007 |
| WO | 2007127521 | 11/2007 |
| WO | WO-2009/036511 | 3/2009 |
| WO | 2009044396 | 4/2009 |

OTHER PUBLICATIONS

European Patent Application No. 09711520.8, Extended Search Report mailed Apr. 27, 2011.

International Application No. PCT/US2010/050616, International Search Report and Written Opinion, Apr. 26, 2011.

International Application No. PCT/US2011/30039, International Search Report and Written, May 23, 2011.

International Application No. PCT/US2011/30038, International Search Report and Written Opinion, May 25, 2011.

Onebip S.R.L., "OneBip—to Pay Online with Your Mobile Phone", Youtube online video at http://www.youtube.com/watch?v=RiEsMcc0tJY, May 23, 2007.

Arrington, Michael, "Mobile Payments Getting Traction on Social Networks but Fees are Sky High", Tech Crunch, located a http://techcrunch.com/2009/01/13mobile-payments-getting-traction-on-social-networks-but-fees-are-sky-high/., Jan. 13, 2009.

Brooks, Rod, "MobilCash:Worlds First in Mobile Payments", YouTube online video located at http://youtube.com/wacth?v=j6Xv35qSmbg,, Oct. 12, 2007.

Bruene, Jim, "PayPal Launcehs on Facebook: Who Wants to be the First Bank?", located at http://www.netbanker.com/2007/06paypal_launches_on_facebook_who_wants_to_be_the_first_bank_on_facebook.html,, Jun. 22, 2007.

Chen, Will, "Gift Shop Credits Have Arrived", The Facebook Blog, located at gttp://blog.facebook.com/blog.php?post=36577782130, Oct. 31, 2008.

Federal Trade Commission, , "Children's Online Privacy Protection Act (COPPA)", 15 U.S.C. §§ 6501-6506, Oct. 21, 1998.

Ihlwan, Moon, "In Korea, Cell Phones Get a New Charge", http://businessweek.com/globalbiz/content/mar2006/gb20060301_260288.htm, Mar. 1, 2006.

Lee, Jessica, "Payment Industry Perspectives: Q&A with Zong CEO David Marcus", http://www.insidefacebook.com/2009/05/19payment-industry-perspectives-qa-with-zong-ceo-david-marcus/, May 19, 2009.

Nicole, Kirsten, "Pay me Lets You Send and Receive Money Through Facebook", http://mashable.com/2007/06/17pay-me-facebook-app, Jun. 17, 2007.

Zong, Inc., , "Virtual Goods/Currency and Mobile Payments: The Business Model for Social Apps", The Zong Blog at http://blog-zong.com/2008/10/25/virtual-goods-currency-and-mobile-payments-the-business-model-for-social-apps/, Oct. 28, 2008.

Zong, Inc., , "Zong Mobile Payment Demo on A Facebook App", You Tube online video at http://www.youtube.com/watch?v=aLjRcAFrGil, Jan. 5, 2009.

Zong, Inc., , "Zong—Mobile Payments for Your Web App", You tube online video at http://www.youtube.com/watch?v=O2C3SQraAvQ, Sep. 5, 2008.

Zong, Inc., , "Zong Mobile Payments in Smallworlds", You Tube online video at htttp://www.youtube.com/watch?v=Y6CEw3tSgBc, Feb. 10, 2009.

Amazon.com, Inc., "Get Gold Box Deals Every Day with Amazon Text Alerts," located at http://www.amazon.com/gp/anywhere/sms/goldbox, available at least by Jun. 10, 2009.

Aradiom Inc., "The Real Solution—Aradiom SolidPass", located at http://www.aradiom.com/SolidPass/2fa-OTP-security-token.htm, available at least by Apr. 24, 2009.

Chua, Lye Heng, "How Customers Applied Java CAPS?" Sun Microsystems, Inc. presentation, Nov. 6, 2007.

Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.

(56) References Cited

OTHER PUBLICATIONS

International Application No. PCT/US2009/033823, International Search Report and Written Opinion, Sep. 24, 2009.
International Application No. PCT/US2009/039723, International Search Report and Written Opinion, Oct. 30, 2009.
International Application No. PCT/US2010/020189, International Search Report and Written Opinion, Dec. 10, 2010.
International Application No. PCT/US2010/021054, International Search Report and Written Opinion, Jul. 29, 2010.
International Application No. PCT/US2010/024525, International Search Report and Written Opinion, May 17, 2010.
International Application No. PCT/US2010/024535, International Search Report and Written Opinion, May 25, 2010.
International Application No. PCT/US2010/030338, International Search Report & Written Opinion, Jun. 3, 2010.
International Application No. PCT/US2010/032668, International Search Report and Written Opinion, Jul. 1, 2010.
International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
International Application No. PCT/US2010/057472, International Search Report and Written Opinion, Jan. 18, 2011.
International Application No. PCT/US2010/059295, International Search Report and Written Opinion, Feb. 1, 2011.
International Application No. PCT/US2010/059466, International Search Report and Written Opinion, Feb. 1, 2011.
International Application No. PCT/US2011/022419, International Search Report and Written Opinion, Mar. 29, 2011.
International Application No. PCT/US2011/022426, International Search Report and Written Opinion, Mar. 28, 2011.
Mobilians Co. Ltd., company website located at http://www.mobilians.co.kr/english/, available at least by Jan. 12, 2009.
PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.
PayPal, Inc., "Texting with PayPal—Easy as Lifting a Finger," located at https://www.paypal.com/cgi-bin/webscr? cmd=xpt/Marketing/mobile/MobileAdvancedFeatures-outside, available at least by Mar. 5, 2009.
Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.
Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.
International Application No. PCT/US2011/029760, International Search Report and Written Opinion, Oct. 28, 2011.
International Application No. PCT/US2011/051094, International Search Report and Written Opinion, Dec. 23, 2011.
International Application No. PCT/US12/25195, International Filing Date Feb. 15, 2012, International Search Report and Written Opinion, Apr. 26, 2012.
International Patent Application No. PCT/US11/51094 filed on Sep. 9, 2011, International Preliminary Report on Patentability mailed on Nov. 2, 2012.

\* cited by examiner

SYSTEMS AND METHODS TO ROUTE MESSAGES TO FACILITATE ONLINE TRANSACTIONS

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity the deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to facilitate online transactions via mobile communications. Some embodiments are summarized in this section.

In one aspect, a system includes a data storage facility to store an account and a phone number associated with the account and an interchange coupled with the data storage facility. The interchange includes a common format processor and a plurality of converters to interface with a plurality of different controllers of mobile communications. The converters are configured to communicate with the controllers in different formats; and the converters are configured to communicate with the common format processor in a common format to facilitate deposit transactions and payment transactions.

In one embodiment, the common format processor is configured to select a first controller from the plurality of controllers based at least in part on reducing a cost associated with transmitting messages from the common format processor to a mobile device at the phone number, and to instruct a first controller of the controllers, via a first converter of the converters, to transmit a first message to the mobile device at the phone number to facilitate an online transaction related to funds associated with the phone number.

In one embodiment, the first message is to confirm a first user request to deposit a first amount of funds into the account associated with the phone number. Responsive to a reply to the first message, the common format processor is to calculate a set of premium messages to charge the first amount and to instruct the first controller, via the first converter, to transmit the set of premium messages to the mobile device at the telephone number to bill the first amount. After a telecommunication carrier of the mobile device deducts a portion from the first amount as a fee, the common format processor is configured to credit the account a second amount more than a portion of the first amount received from the telecommunication carrier.

In another embodiment, the first message is a premium message to collect the funds.

In one embodiment, a method includes: receiving, in a computer, a request related to funds associated with a phone number; identifying, by the computer, a plurality of controllers capable of transmitting a message to a mobile phone at the phone number; determining, by the computer, costs associated with transmitting the message to the mobile phone via different paths through the controllers; selecting, by the computer, a least cost path among the paths; and transmitting, by the computer, the message to the mobile phone via the least cost path to confirm the request.

In another embodiment, a method includes: identifying, by the computer, a plurality of controllers capable of transmitting a message to a mobile phone at the phone number; determining, by the computer, costs associated with transmitting the message to the mobile phone via first paths through the controllers; selecting, by the computer, a least cost path among the first paths; transmitting, by the computer, the message to the mobile phone via the least cost path; receiving, by the computer, a reply to the message to confirm the request; determining, by the computer, costs associated with transmitting a set of one or more premium messages to the mobile phone via second paths; selecting, by the computer, at least one path from the second paths to minimize a cost to transmit the set of premium messages; and transmitting, by the computer, the set of one or more premium messages to the mobile phone via the at least one path selected from the second paths.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to receive deposit requests and payment requests in an online environment. The interchange is configured to communicate with the mobile phones through the different controllers to provide security and convenience for online transactions.

Figure 1:
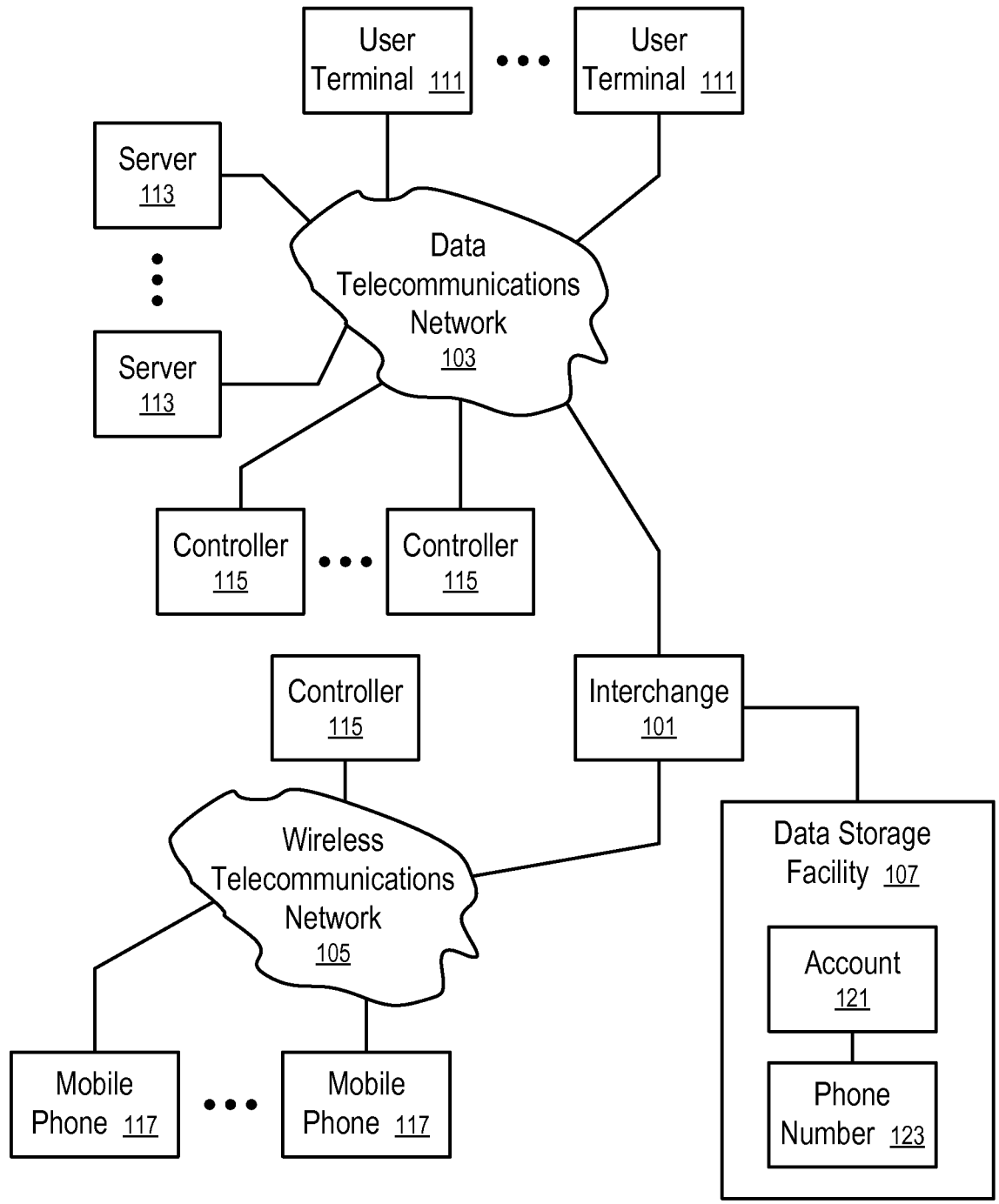
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user accounts (121) and the corresponding phone numbers (123) of the mobile phones (117). The interchange (101) is coupled with the data storage facility (107) to confirm operations in the accounts (121) of the users via mobile communications with the mobile phones (117) at the corresponding phone numbers (123).

In FIG. 1, the interchange (101) may communicate with different controllers (115) of mobile communications via different networks (e.g., 105 and 103) and/or protocols. The interchange processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding accounts (121).

In FIG. 1, the user terminals (111) may use a unified interface to send requests to the interchange (101). For example, a web site of the interchange (101) may be used to receive deposit requests from the web browsers running in the user terminals (111). The deposit requests may be received directly from the user terminal (111), or via a third party which interfaces between the interchange (101) and the user terminal (111). For example, the third party may operate a web site to receive deposit requests from the user terminal (111) and provide the deposit requests to the interchange (101) via an application programming interface (API) (e.g., an API provided using a web service). The user terminals (111) are typically different from the mobile phones (117). In some embodiments, users may use the mobile phone (117) to access the web and submit the deposit request. Alternatively, the users may use the mobile phone (117) to submit the deposit requests via text messaging, email, instant messaging, etc.

The use of the mobile phones (117) in the confirmation of the accounts (121) increases the security of the transaction, since the mobile phones (117) are typically secured in the possession of the users.

Further, in one embodiment, the interchange (101) may use the phone bills of the mobile phones (117) to collect funds for the accounts (121) that are associated with the mobile phone for the convenience of the users (e.g., those who do not have a credit card or a bank account).

In one embodiment, once the user accounts (121) are funded through the mobile phones (117), the users may use the user terminals (111) to access online servers (113) to make purchases. The users can use the accounts (121) to make the payment for the purchases, using the user terminals (111), without revealing their financial information to the operators of the servers (113).

In other embodiments, the interchange (101) may use other fund sources to deposit funds into the account (121). For example, the data storage facility (107) may further store information about other financial accounts of the user, such as bank accounts, credit card accounts, PayPal accounts, etc. (not shown in FIG. 1). Such information about the financial accounts of the user can be associated with the phone number (123) in the data storage facility (107). In response to a deposit request from the user terminal (111), the interchange (101) may identify the phone number (123) to retrieve the information about at least one financial account of the user. Using the phone number (123) the interchange (101) may transmit a confirmation message to the corresponding mobile phone (117). If the user replies to the confirmation message from the mobile phone (117), the interchange (101) may charge the financial account of the user (e.g., via automated clearing house (ACH)) using the information about the financial account to deposit funds into the account (121) of the user. Alternatively, the user may provide the information about the financial account (e.g., a bank account, a credit card number, a charge card number, etc.) from the mobile phone (117) together with the user's reply to the confirmation message. Alternatively, the user may provide the information about the financial account (e.g., a bank account, a credit card number, a charge card number, etc.) from the user terminal (111) together with the deposit request.

In one embodiment, the funds stored in the account (123) are in the unit of a currency (e.g., U.S. dollar, Euro, British pound, etc.) In some embodiments, the funds stored in the account (123) may be in the equivalent unit of a currency, such as points, starts, virtual currency/money, etc.

In one embodiment, the mobile phones (117) are used by the corresponding users to make payments and/or manage funds, such as for making purchases in various websites hosted on the servers (113) of merchants and service providers and/or for transferring funds to or from an account (121) hosted on the data storage facility (107), or other accounts, such as telecommunication accounts of the mobile phones (117) with telecommunication carriers, phone bills of land-line telephone services, credit card accounts, debit card accounts, bank accounts, etc. The mobile phones (117) are used to confirm and/or approve the transactions associated with account (121) (or other accounts). The interchange (101) interfaces the mobile phones (117) and the servers (113) to confirm and/or approve transactions and to operate on the account (121) (and/or other accounts associated with the phone number (123)).

For example, the user terminal (111) may provide the phone numbers (123) to the servers (113) to allow the servers (113) to charge the accounts (121) via the interchange (101). The interchange (101) sends a message to the mobile phone (117) via the phone number (123) to confirm the payment. Once the payment is confirmed via the corresponding mobile phone (117), the interchange (101) pays the server (113) using the funds from the corresponding the account (121) (and/or other accounts associated with the phone number (123), such as bank accounts, credit card accounts, debit card accounts, mobile phone bills/accounts, land-line phone bill/accounts, etc.).

In one embodiment, the user terminal (111) may not even provide the phone number (123) to the server (113) to process the payment. The server (113) redirects a payment request to the interchange (101), which then prompts the user terminal (111) to provide the phone number (123) to the web site of the interchange (101).

For example, the server (113) may redirect the payment request to the web site of the interchange (101) with a reference indicating the purchase made via the user terminal (111). The interchange (101) can use the reference to complete the payment with the server (113) for the purchase, after receiving the phone number (123) directly from the user terminal (111), or other information identifying the account (121), to confirm the payment via the mobile phone (117).

In one embodiment, when the interchange (101) charges on the phone bill of the mobile phone (117) to fund the account (121), the mobile carrier of the mobile phone (117) may deduct a portion from the billed amount from the funds provided to the interchange (101). Thus, the interchange (101) actually receives only a portion of the amount billed to the mobile phone (117). However, the interchange (101) may credit the full amount to the account (121) associated with the mobile phone (117). The fees taken by the mobile carrier can be recovered through charging the user and/or the merchant for the usage of the account (121).

For example, the interchange (101) may charge the account (121) a fee for paying the server (113) to complete a purchase; and the interchange (101) may charge the server (113) a fee for transferring the funds to the server (113) (e.g., by deducting a portion from the amount paid by the user to the operator of the server (113)). For example, the interchange (101) may charge a periodic fee (e.g., a monthly fee) to maintain the account (121). The interchange (101) may charge a fee when the funds are initially deposited into the account (121) via the mobile phone (117), where the fee is smaller than the fee charged by the mobile carrier.

In one embodiment, the overall fees charged by the interchange (101) may be equal to or larger than the initial fees charged by the mobile carrier to deposit the funds into the account (121), to avoid losing money. In some embodiment, the operations of the interchange (101) may be supported by advertisements; and the interchange (101) may charge less than what the mobile carrier charges to deposit the funds into the account (121).

For example, the interchange (101) may spread out the charges by the mobile carrier for depositing the funds into the account (121) on a per transaction basis or a per process basis, instead of a lump sum at the time the user deposits funds into his account (121).

For example, the interchange (101) may charge the user account (121) a smaller fee than what the mobile carrier charges, when the funds are initially deposited into the user account (121) via the mobile carrier. For instance, when a user deposits $10 to the account (121) via the mobile carrier, the mobile carrier may take $3 (30%), providing $7 to the interchange (101). The interchange (101) may charge the user only $1, and thus credit the account (121) with $9; alternatively, the interchange (101) may credit the account (121) with the full $10, without deducting the amount that is charged by the mobile carrier, at the time the funds are deposited.

However, for the amount credited to the account (121), the interchange (101) is configured to pass to the merchants only $7 of the funds received from the mobile carrier for the purchases made by the user. The merchants may be the operators of the servers (113). The interchange (101) may charge the user and/or the merchant fees on a per transaction basis. For example, the user may be charged an amount for a payment to the merchant; and the merchant may be charged another amount for the payment. Thus, the fees charged by the mobile carrier are actually deferred until the funds in the account are used; and the cost for the fees charged by the mobile carrier can be shared by the user and the merchant.

In some embodiments, the user may request a loan from the interchange (101) for the account (121); and the loan is repaid through billing the mobile phone (117). The interchange may charge interest for the loan.

Figure 2:
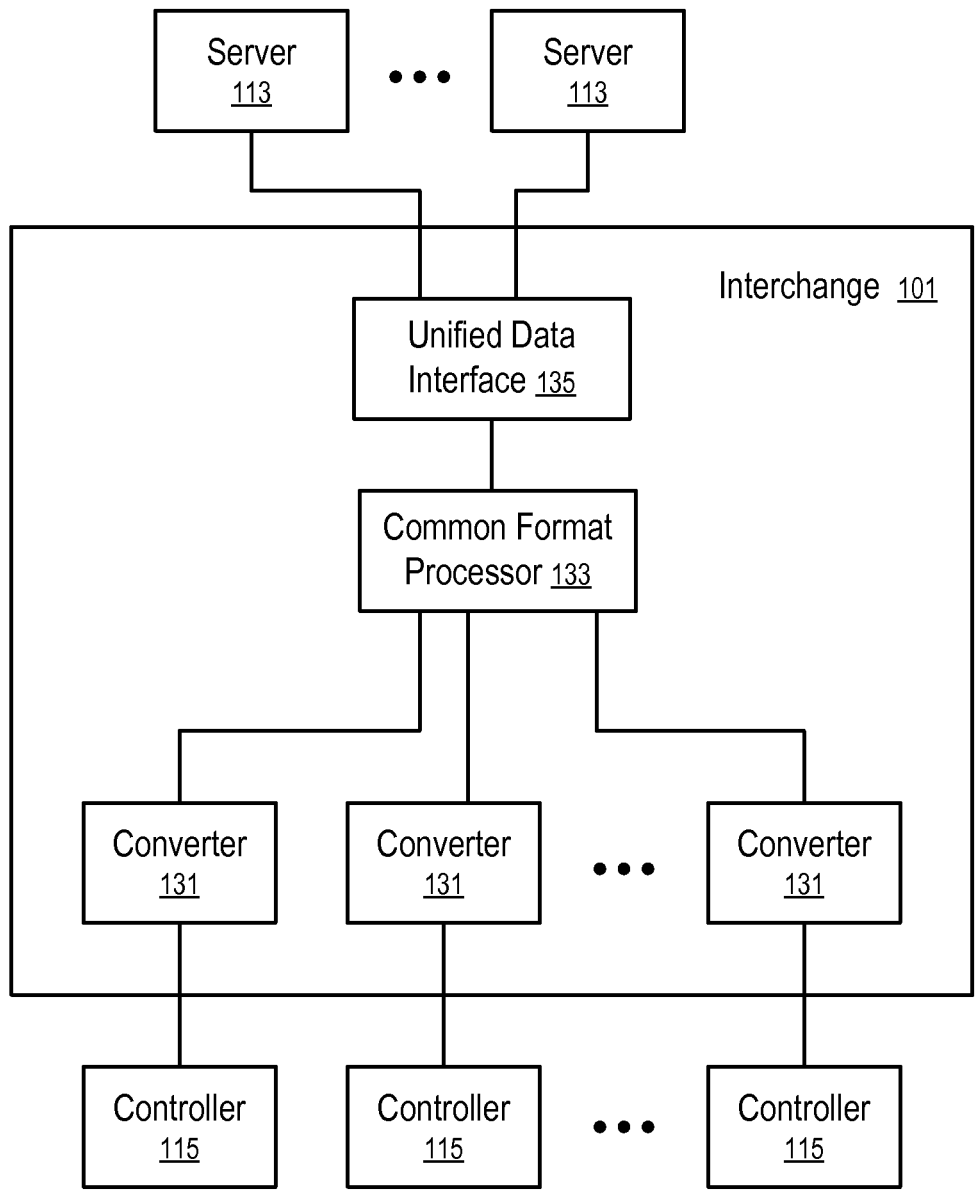
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (123), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account (121), and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
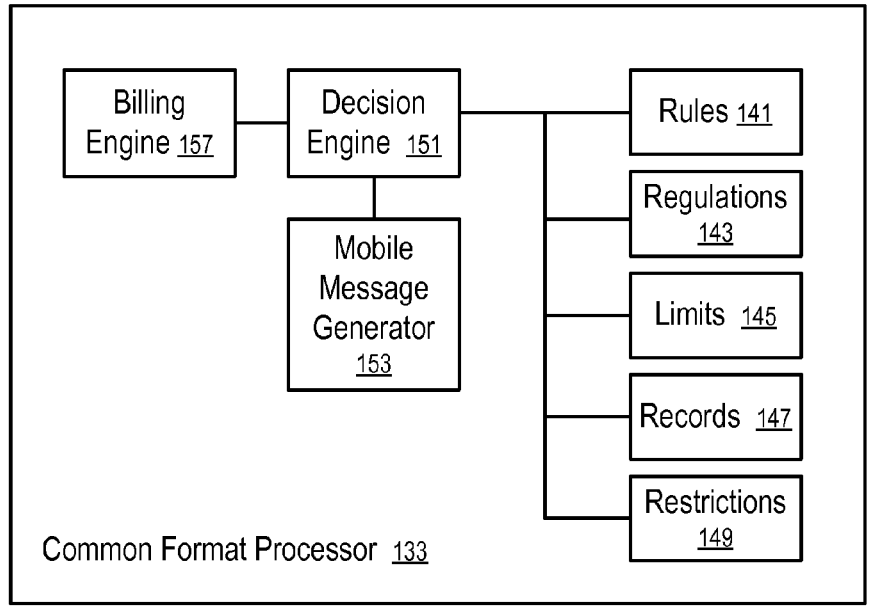
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator bill, credit card, stored value account (121), and other online payment options.

The common format processor (133) includes a decision engine (151) which decides how to generate a set of one or more messages to the mobile phone (117), based on a set of rules (141), regulations (143), limits (145), records (147) and restrictions (149).

For example, different countries have different regulations (143) governing the mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Base on results of the decision engine (151), the mobile message generator (153) generates one or more messages to communicate with the mobile phone (117) about the transaction (e.g., a deposit request or a payment request). The converter (131) then interfaces with the corresponding controller (115) to transmit the messages to the mobile phones (117).

Figure 4:
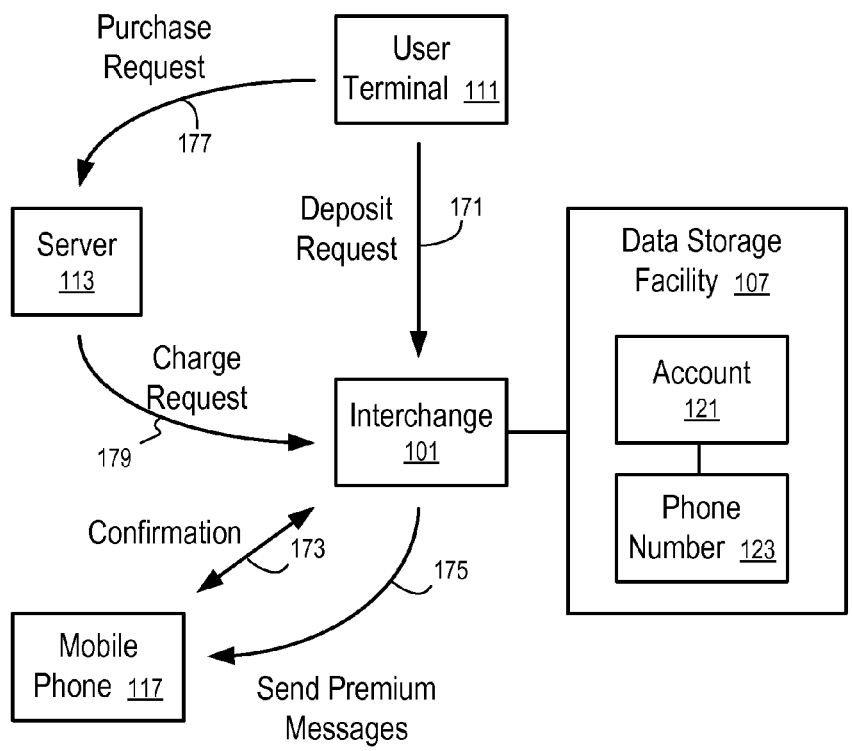
FIG. 4 shows a method to facilitate an online transaction using an interchange according to one embodiment.

FIG. 4 shows a method to facilitate an online transaction using an interchange according to one embodiment. In FIG. 4, the interchange (101) receives a deposit request (171) from a user via a user terminal (111), such as a device running a web browser. The user terminal (111) is typically different from the mobile phone (117). However, in some embodiments, the mobile phone (117) may also be used as the user terminal (111) to submit the deposit request (171).

The deposit request (171) may be a request for a loan to fund the user account (121) associated with the phone number (123) and stored in the data storage facility (107), or a request to fund the account (121) via premium messages (175) charged to the mobile phone. The loan may be repaid via subsequent premium messages (175) charged to the mobile phone.

In FIG. 4, the deposit request (171) is confirmed via a round trip confirmation message from the interchange (101) to the mobile phone (117), such as a round trip SMS message. Alternatively, the confirmation messages can be sent to the mobile phone (117) associated with the phone number (123) via emails, instant messages, etc. After the confirmation, the interchange (101) sends the premium messages (175) to bill the mobile phone for the deposit (or to make a loan to the account (121)). In other embodiments, the interchange (101) may charge a credit card account, or a bank account, associated with the phone number (123) to fund the account (121). In some embodiments, the interchange (101) may send an instruction with the confirmation message to the mobile phone (117) to instruct the user to send mobile originated premium messages to the interchange to fund the account (121).

The account (121) stored in the data storage facility (107) can be used to pay purchases made via the server (113). For example, after the user terminal (111) transmits the purchase request (177) to the server (113), the server (113) redirects the purchase request to the interchange (101), or directly contacts the interchange (101) for the payment (e.g., after collecting account information, such as the phone number (123), from the user terminal (111)).

To complete the payment, the interchange (101) contacts the mobile phone (117) via text messaging (or other types of messages, such as instant messages, emails, etc.) to confirm the payment. The interchange (101) uses the funds in the account (121) to make the payment once a confirmation is obtained from the mobile phone (117). For example, the interchange (101) may use its own bank account to pay the merchant operating the server (113) and deduct an amount from the account (121). Thus, the financial information of the user is not revealed to the merchant.

Figure 5:
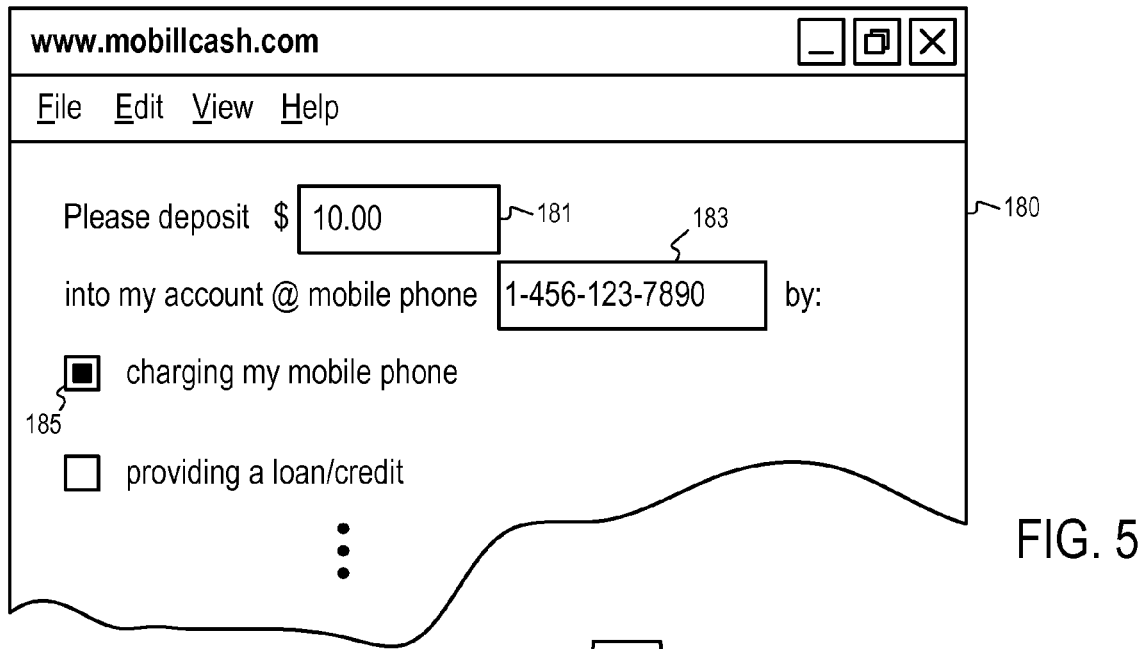
FIG. 5 illustrates a user interface to initiate a deposit transaction according to one embodiment.

FIG. 5 illustrates a user interface to initiate a deposit transaction according to one embodiment. In FIG. 5, the user interface (180) may be presented via a web browser (or a custom application) to submit a deposit request from a user terminal (111) to the interchange (101). Alternatively, the deposit request can be submitted from the mobile phone (117) via a message sent via SMS, WAP, voice mail, or via an interactive voice response (IRV) system. In FIG. 5, the user interface (180) includes a text field (181) that allows the user to specify a particular amount to be deposited into the account (121) associated with the phone number (123) specified in the text field (183).

In FIG. 5, the user interface (180) further includes an option list, which allows the user to select various ways to fund the account (121), such as charging the mobile phone (117) on its phone bill, requesting a loan (e.g., to be repaid via the phone bill), charging credit cards or bank accounts associated with the account (121), etc. In the example illustrated in FIG. 5, the checkbox (185) is selected to request a deposit via charging the mobile phone (117) (e.g., via premium messages, via operator billing by mobile phone carrier).

In one premium message billing method, the interchange (101) sends mobile terminated premium SMS messages to the mobile phone to bill the user, or requests the mobile phone to send mobile originated premium SMS messages to a short code representing the interchange (101).

In one operator billing method, the interchange directly sends a message to the mobile carrier of the mobile phone (117) to bill the amount on the phone bill of the mobile phone (117), without having to send a premium message to the mobile phone (117).

In one embodiment, after the deposit request is submitted via the user interface (180), the interchange (101) sends a text message to the mobile phone (117) to request a confirmation.

Figure 6:
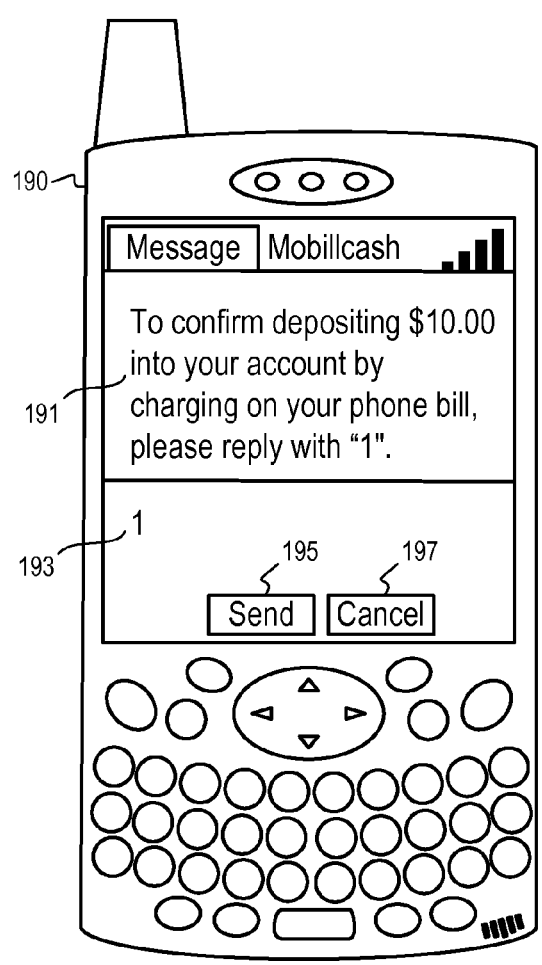
FIG. 6 illustrates a user interface to confirm a deposit transaction according to one embodiment.

FIG. 6 illustrates a user interface to confirm a deposit transaction according to one embodiment. In FIG. 6, the user interface (190) is presented via a mobile phone (117). The text message (191) from the interchange (101) includes the amount requested by the user (e.g., via the user interface (180)) and instructs the user to reply with a code (e.g., "1") to confirm the request. In one embodiment, the confirmation message (191) is transmitted to the mobile phone (117) via SMS (or text messaging via other protocols). In other embodiment, the confirmation message (191) can be sent to the mobile phone (117) via email, wireless application protocol (WAP), a voice message, a voice call from an automated voice system (e.g., controlled via an interactive voice response system), etc.

In the user interface (190), the user may enter the code (193) (e.g., "1") in the reply message and select the "send" (195) button to confirm the deposit request (or select the "cancel" (197) button to ignore the message and thus block the request).

In one embodiment, the code requested in the text message (191) is a predetermined code and is provided in the text message (191). The presence of the code in the reply message is an indication of the user approving the request; and the requirement for such a code in the reply eliminates false confirmations (e.g., generated via accidental replies or automated replies).

In some embodiments, the code requested in the text message (191) may be a personal identification number (PIN) associated with the account (121). The text message (191) does not include the code; and the knowledge of the code is an indication of the identity of the user. Thus, the use of such a code increases the security of the transaction.

In a further embodiment, the code requested in the text message (191) includes a code that is provided in response to the deposit request (e.g., via the user interface (180), not shown in FIG. 5). The code may be generated randomly at the time the request is received via the user interface (180), or when the user interface (180) is presented to the user. The code provided to the user interface (180) can be requested in the reply received in the user interface (193) to indicate that the user who is in possession of the mobile phone (117) has actual knowledge about the deposit request submitted via the user interface (180).

In a further embodiment, a secret code is provided in the confirmation message (191). The user may use the secret code in the user interface (180) provided on the user terminal (111) to confirm that the user has received the secret code provided to the mobile phone (117) and approve the deposit request via the mobile phone (117) without having to reply from the mobile phone (117). In one embodiment, the secret code is a random number, a random character string, or a random string of words generated by the interchange (101) in response to the deposit request. In some embodiment, the secret code is an identifier that represents the transaction associated with the deposit request. The user may approve the confirmation message via providing the secret code back to the interchange (101) via replying from the mobile phone (117) where the user receives the secret code, and/or replying from the user terminal (111) where the user initially submits the deposit request.

After the confirmation message is received with the correct code, the interchange (101) performs operations to fund the account (121), according to user selected options.

In some embodiments, the user may select the options via the replying text message sent via the user interface (190), instead of the user interface (180) used to make the request. In some embodiments, the user may make the request via a mobile phone (e.g., by sending a text message to a short code representing the interchange (190)).

In a premium message billing method, the interchange (101) calculates the required premium messages to bill to the mobile phone (117). For example, mobile terminated premium SMS messages may have a predetermined set of prices for premium messages. The interchange (101) determines a combination of the premium messages that has a price closest to the amount specified by the user, and sends this combination of premium messages to the mobile phone (117) according to the rules (141), regulations (143), limits (145), records (147), restrictions (149), etc.

Mobile originated premium SMS messages may also have a predetermined set of prices for premium messages. The interchange (101) can calculate the set of messages required to make the deposit and transmit a text message to the mobile phone (117) of the user to instruct the user to send the required number of premium messages to make the deposit.

Figure 7:
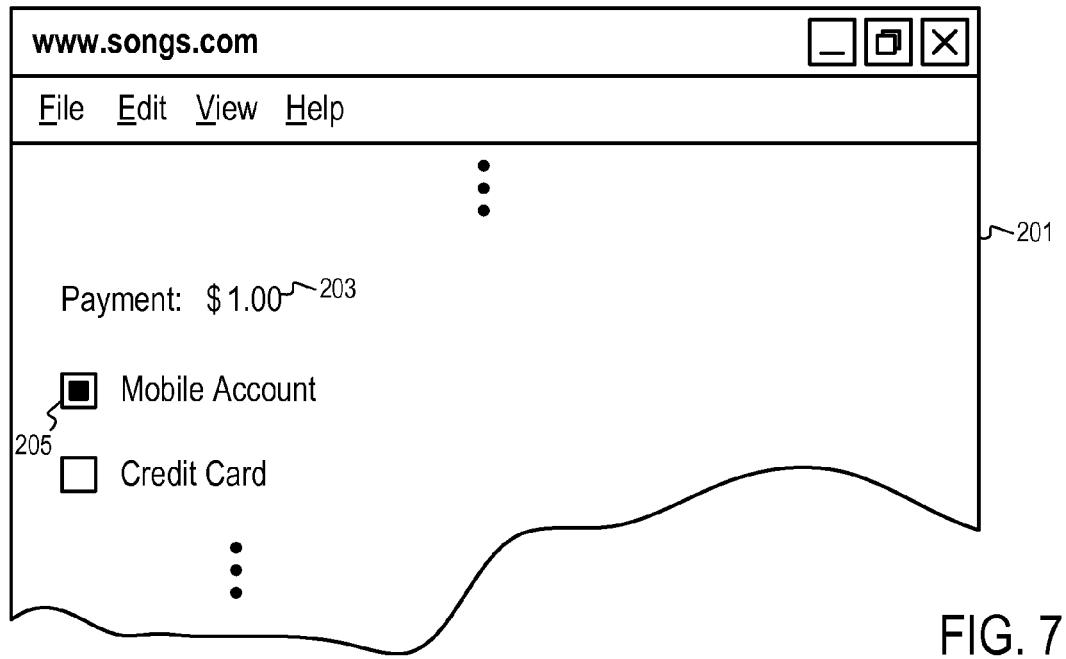
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase in the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

In one embodiment, the server (113) presents the payment option (205) via an online shopping cart system or a third party checkout system. Alternatively or in combination, the server (113) presents the payment option (205) via a web widget. For example, a web widget may include a program code that is portable and executable within a web page without requiring additional compilation. The web widget allows the user to select the option (205) to pay for the product and/or service without leaving the web page or refreshing the web page. In one embodiment, the interchange (101) provides the web widget to facilitate the payment processing.

Figure 8:
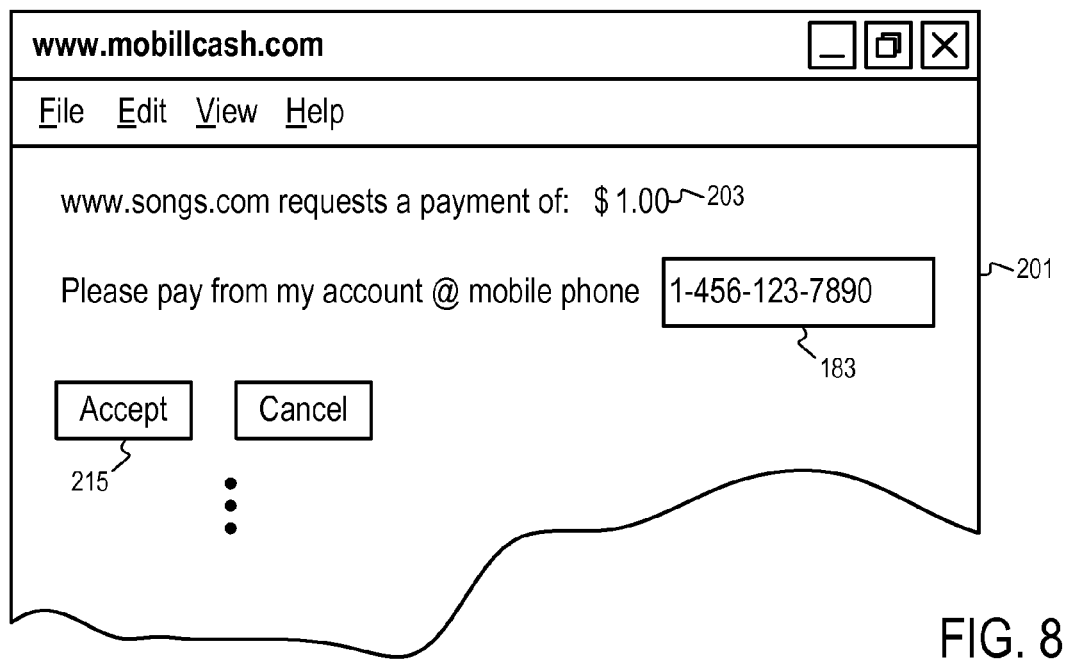
FIG. 8 illustrates a user interface to initiate a payment request according to one embodiment.

FIG. 8 illustrates a user interface to initiate a payment request according to one embodiment, after the payment request is redirected to the web site of the interchange (101). In FIG. 8, the user interface (201) includes the identity of the merchant and the amount (203) of the requested payment. The user interface (201) includes a text field (183) to allow the user to provide the phone number (123) to identify the account (121).

In other embodiments, the user interface (201) may request a PIN for enhanced security. For example, the user may be required to register with the interchange (101) prior to using the services of the interchange (101); and after registering with the interchange (101), the user is provided with the PIN or can created a customized PIN to access the functionality provided by the user interface (201). User authentication may be used to reduce false messages to the phone number (123).

Alternatively, the user interface (201) may request an identifier of the account (121) to initiate the payment transaction. In some embodiments, the user interface (201) requires the user to provide no information other than the phone number (123) in the text field (183) to initiate the transaction.

In one embodiment, once the user selects the "accept" button (205), the interchange (101) transmits a confirmation message to the mobile phone (117) according to the phone number (123) provided in the text field (183).

Figure 9:
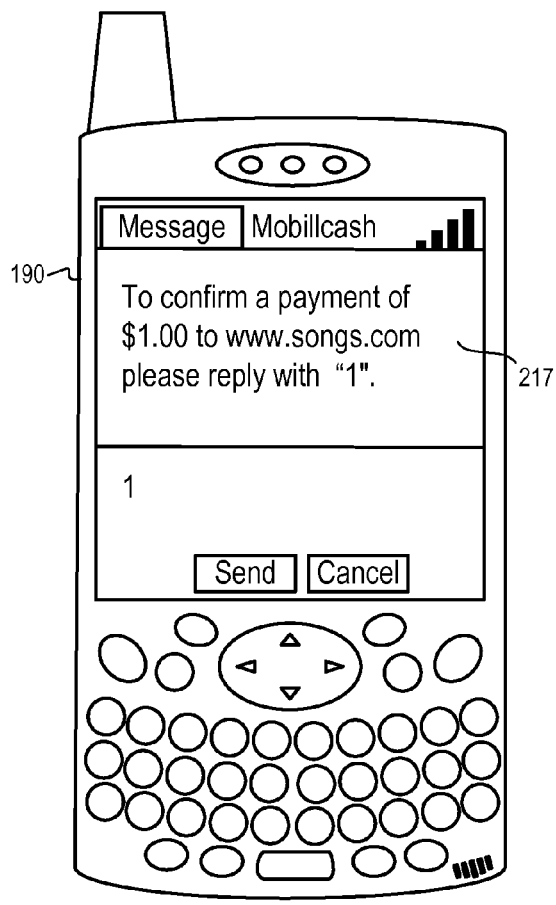
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code provided in the confirmation message (217) as illustrated in FIG. 9. Alternatively, the requested code may include a PIN associated with the account (121), and/or a code (not shown) randomly generated and presented in the user interface used to initiate the payment transaction (e.g., user interface (201)). Alternatively, a secret code representing the payment request may be provided in the confirmation message (217); and the user may approve the payment transaction providing the secret code back to the interchange (101) via replying from the mobile phone (117) where the user receives the secret code, and/or replying from the user terminal (111) where the user submits the payment request.

After the correct reply is received, the interchange (101) pays the payee using the funds from the account (121) and notifies the user when the payment transaction is complete.

Figure 10:
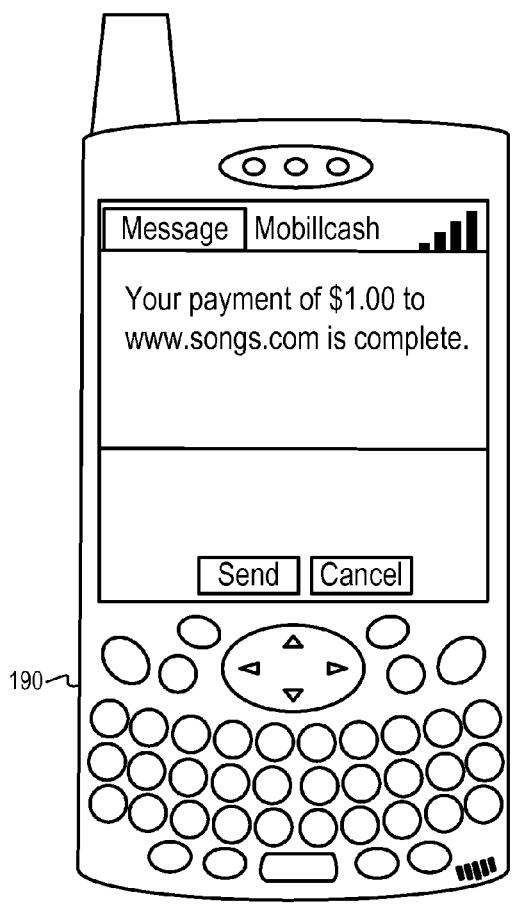
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number and may select one as a delivery address in the confirmation/approve message to the interchange (101). Alternatively, the interchange (101) may receive an address for product delivery from the mobile phone (117) together with the confirmation/approve message and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 11:
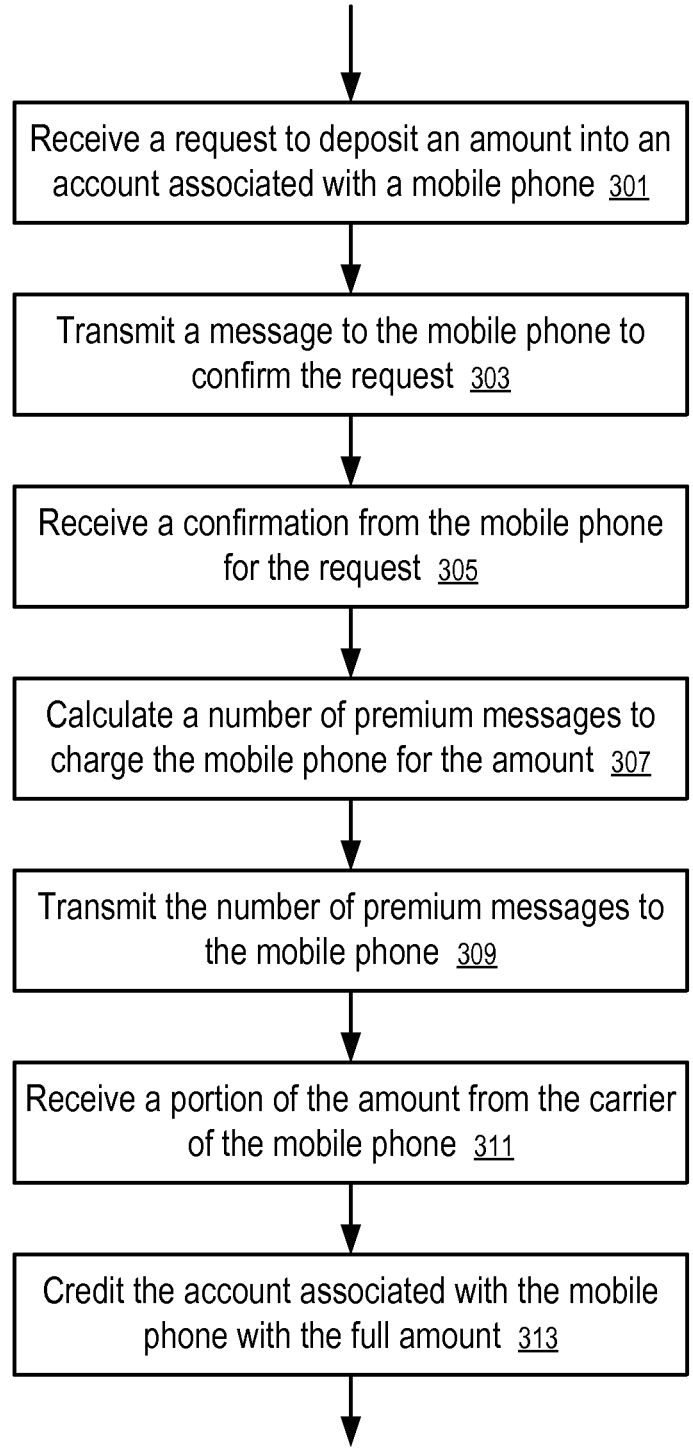
FIG. 11 shows a method to facilitate a deposit transaction according to one embodiment.

FIG. 11 shows a method to facilitate a deposit transaction according to one embodiment. In FIG. 11, the interchange (101) receives (301) a request (171) to deposit an amount into an account (121) associated with a mobile phone (117). In response, the interchange (101) transmits (303) a message (191) to the mobile phone (117) to confirm (173) the request. After receiving (305) a confirmation from the mobile phone (303) for the request, the interchange (101) calculates (307) a number of premium messages to sent to the mobile phone (117) for the amount and transmits (309) the number of premium messages to the mobile phone (117). Alternatively, the interchange (101) may include an instruction in the confirmation message to request the user to send premium SMS messages to the interchange (101).

After receiving (311) a portion of the amount from the carrier of the mobile phone, the interchange (101) may credit (313) the account associated with the mobile phone (117) with the full amount (or an amount larger than the portion received from the carrier, or even an amount larger than what the user is charged via the phone bill). The carrier may keep a portion of the amount as fees for the services provided by the carrier in processing the premium message.

Alternatively, the interchange (101) may credit the same amount as the portion received from the carrier, and deduct the portion that was taken by the carrier as a fee for collecting the funds via the phone bill.

Figure 12:
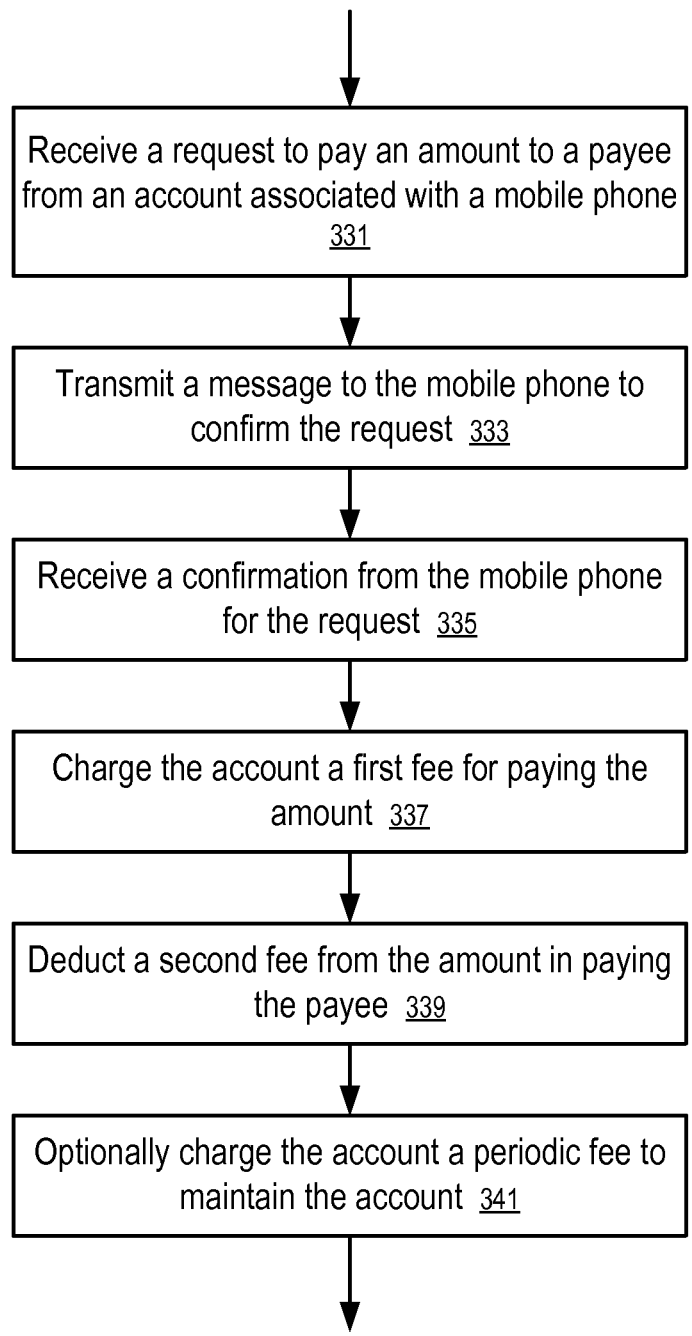
FIG. 12 shows a method to facilitate a payment transaction according to one embodiment.

FIG. 12 shows a method to facilitate a payment transaction according to one embodiment. In FIG. 12, the interchange (101) receives (331) a request to pay an amount to a payee from an account (121) associated with a mobile phone (117). In response, the interchange (101) transmits (333) a message (217) to the mobile phone to confirm the request. After receiving (335) a confirmation from the mobile phone (117) for the request, the interchange (337) charges (337) the account a first fee for paying the amount and deducts (339) a second fee from the amount in paying the payee. Optionally, the interchange (101) may further charge (341) the account (121) a periodic fee to maintain the account (121), such as a monthly fee.

In one embodiment, the merchant may specify the second fee. Different merchants may offer different percentages of the purchase prices as the second fee; and the interchange (101) may calculate the first fee based on the second fee offered by the merchant, by deducting the second fee from the fees charged by the telecommunication carrier for collecting the funds via the mobile phone bill associated with the telephone number and/or the fees charged by the interchange (101) for processing the payments. Since the first fee is charged to the customer (e.g., the purchaser of products and services), the cost to the customer can vary based on the selection of the merchant. For the same purchase prices, the first fee (and thus the cost to the customer) may be different for purchases made via different merchants, because the merchants may offer different percentage of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, the common format processor (133) of the interchange (101) is configured to route messages to the mobile phone (117) at the phone number (123) via the least cost path through mobile carriers, aggregators and providers.

In one embodiment, there are multiple paths to route a message from the interchange (101) to the mobile phone (117) at the phone number (123). For example, one path may involve one controller (115); and another path may involve multiple controllers (115). For example, the interchange (101) may route a message directly to a mobile carrier, or to the mobile carrier via a mobile aggregator.

Different controllers (115) may charge different amounts for facilitating the transmitting of the message (e.g., via SMS or other protocols); and some of the controllers may not charge a fee for transmitting a message (e.g., under certain conditions, and/or for a specific type of messages).

Further, different controllers may charge for their services based on different payment models. For example, one controller (115) may charge a flat fee for each message transmitted by the controller (115); another controller (115) may charge a subscription fee for messages transmitted within a period of time (e.g., a month); and a subscription may have a restriction on the total number of messages transmitted within the subscription period. Some controllers (115) may charge the interchange (101) a price based on the volume of the messages transmitted via the controllers (115).

Further, in some embodiments, a mobile phone (117) may have multiple ways to receive a message. For example, a mobile phone (117) may receive a message via a cellular communications network, via a wireless local area computer network (e.g., WiFi), via a wireless personal area network (e.g., Bluetooth) and/or a wired connection (e.g., a temporary connection when the mobile phone (117) is docked to a PC). Different controllers (115) may be used to transmit the messages to the mobile phone (117) via different ways to reach the mobile phone (117).

In one embodiment, the interchange (101) is configured to identify the different paths to transmit a message to the mobile phone (117) and select a least cost path to transmit the message.

Further, the interchange (101) may transmit different messages, or different types of messages, to the mobile phone (117) via different controllers (115) or paths to reduce cost.

For example, in one embodiment, the interchange (101) is to use one controller/path to transmit non-premium, confirmation messages to the mobile phone (117) to confirm purchase requests, or deposit requests, and to use another controller/path to transmit premium messages to the mobile phone (117) to collect funds. In one embodiment, both the confirmation messages and the premium messages are transmitted via short message service (SMS). In another embodiment, the confirmation messages and the premium messages are transmitted via different types of services to reduce cost. In one embodiment, the interchange (101) is configured to select a service type that can result in a least cost for the transmission of the message to the mobile phone (117).

In one embodiment, the available options, prices and restrictions for routing messages to the mobile phone (117) are stored (e.g., in the data storage facility (107)) for the decision engine (151) of the common format processor (133). The decision engine (151) is to identify a least cost message transmission path for communicating a message to the mobile phone (117) at the phone number (123).

In one embodiment, the mobile phone (117) is configured to report to the interchange (101) the different ways the mobile phone (117) can receive messages from the interchange (101) while the mobile phone (117) is at a particular location, or in a particular mode. Thus, the decision engine (151) can select a least cost path to route the message to the mobile phone (117). Alternatively, the interchange (101) may communicate with the telecommunication carrier of the mobile phone (117), or a separate server configured to track the current communication capabilities of the mobile phone (117) at the phone number (123), to obtain the information on different options to transmit messages to the mobile phone (117).

Figure 13:
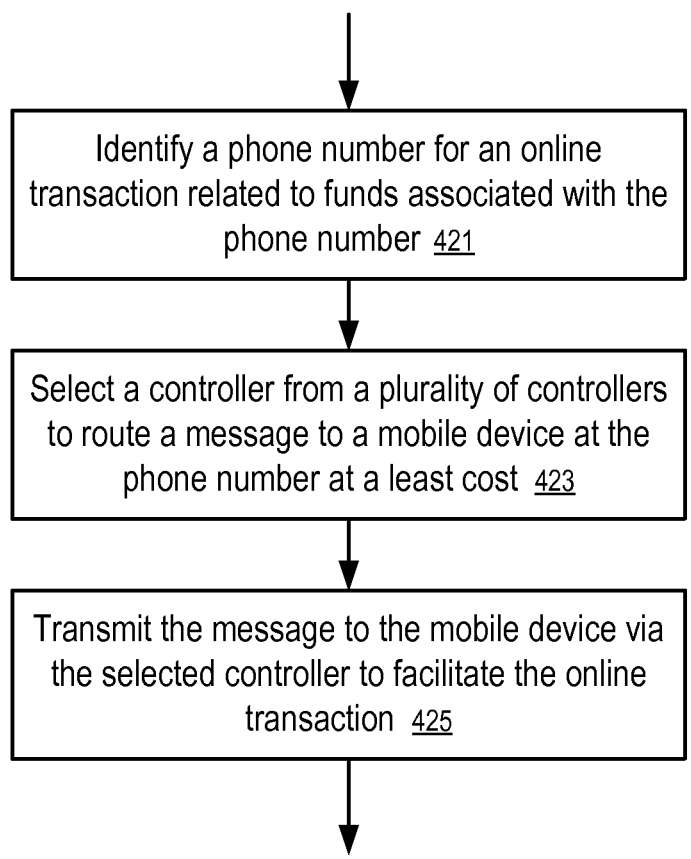
FIGS. 13 and 14 show methods to route messages to facilitate online transactions according to some embodiments.
Figure 14:
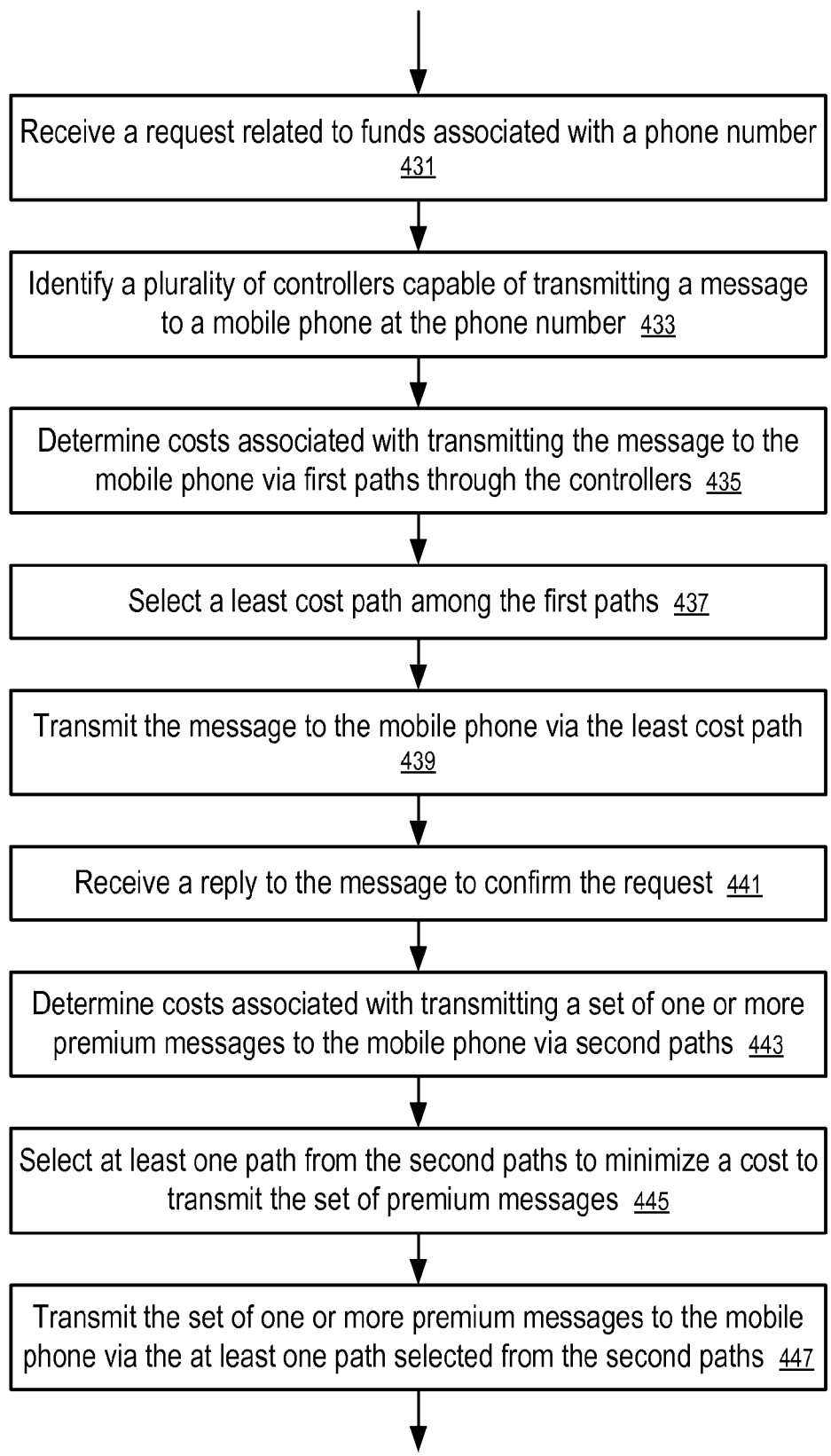

FIGS. 13 and 14 show methods to route messages to facilitate online transactions according to some embodiments.

In FIG. 13, the common format processor (133) is configured to identify (421) a phone number (123) for an online transaction related to funds associated with the phone number (123), to select (423) a controller (115) from a plurality of controllers (115) to route a message to a mobile device at the phone number (123) at a least cost, and to transmit (425) the message to the mobile device via the selected controller (115) and a corresponding converter (131) to facilitate the online transaction. In one embodiment, the mobile device includes a mobile phone (117), such as a cellular phone, a satellite phone, a wireless local area network based phone, etc.

In one embodiment, the plurality of controllers (115) include mobile carriers, aggregators and providers. Among different paths through the plurality of controllers (115), the common format processor (133) of the interchange (101) is configured to determine a path through the selected controller (115) that has a least cost in transmitting the message to the mobile device. In some embodiments, the path may include more than one controller (115); and the interchange (101) may specify a desired path to route the message to the mobile phone (117).

In another embodiment, the path is selected by selecting the controller (115) with which a corresponding converter (131) interacts. The selected controller (115) determines the path.

In one embodiment, the message is sent to the mobile phone (117) to confirm a payment using the funds for a purchase made on a user terminal (111) separate from the mobile phone (117).

In another embodiment, the message is a premium message, which is transmitted to the mobile phone (117) at the phone number (123) to collect the funds. The funds can be collected in the online transaction for deposit in the account, or be used to make a payment for a purchase made on a user terminal (111), which may be separate and distinct from the mobile phone (117) of the user.

In another example, the message is a non-premium message sent to the mobile phone (117) to confirm the online transaction, such as making a deposit into the account (e.g., via the telephone bill for the mobile phone (117), or via a credit card number, a debit card number, or a bank card number) associated with the phone number (123) in the data storage facility (107). In some embodiments, the interchange (101) may also associate the email address of the user with the phone number (123) in the data storage facility (107) and use a storage value account identified by the email address of the user to fund the account (121) hosted on the data storage facility (107). In one embodiment, the funds collected via a credit card of the user (or a debit card of the user, a bank account of the user, or an account identified by an email address of the user) may be used directly to make the payment, without having to store the funds in the account (121).

In one embodiment, different types of funds may be used. For example, instead of collecting funds via mobile terminated premium messages, mobile initiated premium messages may be used. For example, the funds may be collected via operator bill, or via charging debit accounts, credit accounts, or via Automated Clearing House (ACH), or an account hosted on a third party which in turn obtain funds via different methods. When the interchange (101) uses different types of funds for payment (or for deposit into the account (121)), there may be different costs associated with accessing the funds. In one embodiment, the interchange (101) selects a type of the funds, for the fulfillment of the payment or deposit request, in determining the least cost path for routing the message. Thus, the cost for routing the message includes the cost for accessing the funds.

Further, the source (e.g., controlled by a third party) from which the interchange (101) obtains the funds may have different ways to provide the funds at different costs, which are considered by the interchange (101) in determining how to route the messages to obtain the funds. For example, in one embodiment, the interchange (101) may obtain funds from an account hosted on a third party and identified by an email address of the user. The account hosted on the third party may be funded via different methods, such as credit card, bank account, ACH, etc., which may have different prices for accessing a same amount of funds. In one embodiment, the interchange (101) further considers these prices in routing the messages to reduce cost. For example, in one embodiment, the interchange (101) may transmit the message to cause a particular types of funds are used to fund the account hosted on the third party, before requesting the funds from the account hosted on the third party. Alternatively, the interchange (101) may specify, in a request to the third party for funds, a particular way by the third party to fund the request. In some embodiments, the interchange (101) selects a least costly way to obtain the funds a payment or deposit request, where the cost includes the cost to transmit the messages and the cost for obtaining the funds. After the least costly way is identified, the interchange (101) routes the message accordingly.

In one embodiment, the message is to confirm a user request to deposit a first amount of funds into the account (121) associated with the phone number (123). Responsive to a reply to the first message, the common format processor (133) is to calculate a set of premium messages to charge the first amount and to instruct the controller (115), via the corresponding converter, to transmit the set of premium messages to the mobile phone (117) at the phone number (123) to bill the first amount. After a telecommunication carrier of the mobile phone (117) deducts a portion from the first amount as a fee, the common format processor (133) is to credit the account (121) a second amount more than a portion of the first amount received from the telecommunication carrier. In one embodiment, the second amount is equal to the first amount.

In one embodiment, the common format processor (133) uses a decision engine (151) to calculate the set of premium messages based on a set of predetermined constraints and uses a mobile message generator (153) to generate the messages, including the message to confirm the user request and the set of premium messages.

In one embodiment, the common format processor (133) routes the premium messages through the selected controller (115) to minimize a cost in transmitting the set of premium messages.

In another embodiment, the common format processor (133) selects different controllers (115) for routing the message to confirm the user request and for routing the set of premium messages.

In a further embodiment, the common format processor (133) may select different controllers (115) to route different messages in the set of premium messages, to reduce the total cost for transmitting the set of premium messages.

In one embodiment, the non-premium message sent to the mobile phone (117) to confirm the user request and the set of premium messages are transmitted via short message service (SMS). In another embodiment, the premium messages are transmitted via short message service (SMS); and the non-premium message is transmitted via other types of services, such as WAP message, voice message, email, instant message, etc.

In FIG. 14, the interchange (101) is to receive (431) a request related to funds associated with a phone number (123). In one embodiment, the request is received via a website of the interchange (101); and the request may be received from the user terminal (111), or from a server (113) in response to the user interacting with the server (113) using the user terminal (111).

In one embodiment, the interchange (101) is to identify (433) a plurality of controllers (115) capable of transmitting a message to a mobile phone (117) at the phone number (123), determine (435) costs associated with transmitting the message to the mobile phone (117) via first paths through the controllers, select (437) a least cost path among the first paths, and transmit (439) the message to the mobile phone (117) via the least cost path.

In one embodiment, after the interchange (101) receives (441) a reply to the message to confirm the request, the interchange (101) is to determine (443) costs associated with transmitting a set of one or more premium messages to the mobile phone (117) via second paths, select (445) at least one path from the second paths to minimize a cost to transmit the set of premium messages, and transmit (447) the set of one or more premium messages to the mobile phone (117) via the at least one path selected from the second paths.

In one embodiment, the interchange (101) is to store the funds collected via the set of one or more premium messages in the account (121) hosted on the data storage facility (107) of the interchange (101). Due to the cost of the premium messages, the amount of funds collected at the interchange (101) is less than the amount the user is charged on the bill for the mobile phone (117). In one embodiment, the interchange (101) may credit the user the full amount the user is charged on the bill for the mobile phone (117); and the interchange (101) may charge the user fees to make payments using the funds stored in the account (121) and/or charge the user fees for maintaining the account (121) to recover the difference between the actual amount of funds collected at the interchange (101) and the full amount the user is charged on the bill for the mobile phone (117) and credited in the account (121).

In another embodiment, the request is for a payment on behalf of the user having the phone number (123); and the interchange (101) is to use the funds collected via the set of one or more premium messages to fulfill the payment on behalf of the user having the phone number (123).

In one embodiment, to confirm the request, the user having the phone number (123) is to provide the reply with a code, such as a PIN of the user, a code specified in the message transmitted to the mobile phone (117), or a code provided to the user terminal (111) to identify the purchase transaction associated with the payment, etc. In some embodiments, multiple codes are requested.

In one embodiment, the reply is received from the mobile phone (117). In another embodiment, the message transmitted to the mobile phone (117) includes a one-time code; and the user is to provide the reply, together with the one-time code via the user terminal (111), to the website of the interchange (101) to confirm the request.

In another embodiment, instead of sending the message to the mobile phone (117) to confirm the request, the interchange (101) may provide a one-time code to the user terminal (111) via the website of the interchange (101) and request the user to provide the one-time code back to the interchange (101) using the mobile phone (117).

Figure 15:
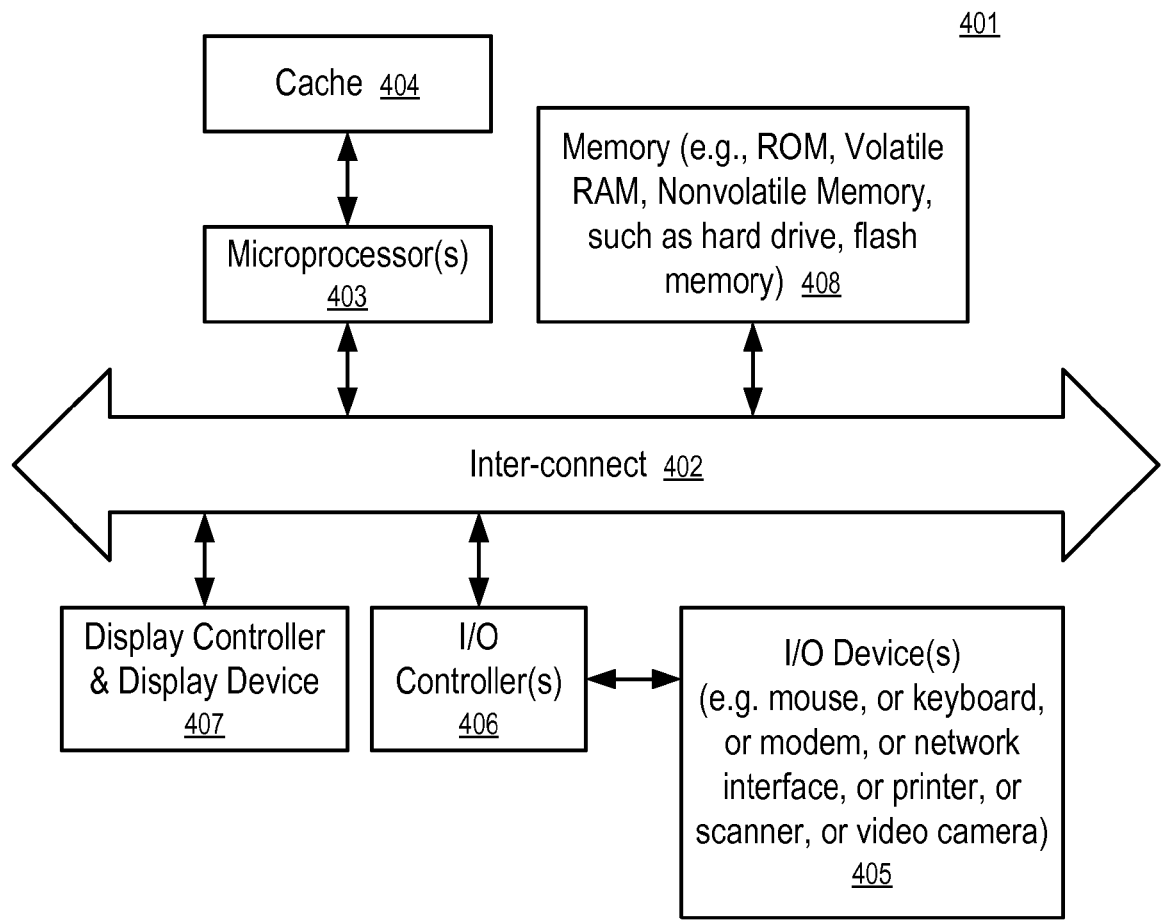
FIG. 15 shows a data processing system, which can be used in various embodiments.

FIG. 15 shows a data processing system, which can be used in various embodiments. While FIG. 15 illustrates various components of a computer system, it is not intended to represent any particular architecture or manner of interconnecting the components. Some embodiments may use other systems that have fewer or more components than those shown in FIG. 15.

In one embodiment, each of the interchange (101), the data storage facility (107), the controllers (115), the mobile phones (117), the user terminals (111) and the servers (113) can be implemented as a data processing system, with fewer or more components, as illustrated in FIG. 15.

In FIG. 15, the data processing system (401) includes an inter-connect (402) (e.g., bus and system core logic), which interconnects a microprocessor(s) (403) and memory (408). The microprocessor (403) is coupled to cache memory (404) in the example of FIG. 15.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The tangible computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a data storage facility to store an account of a user and a phone number associated with the account; and
   an interchange coupled with the data storage facility, the interchange including a common format processor and a plurality of converters to interface with a plurality of controllers, the converters configured to communicate with the controllers in different formats, the converters to communicate with the common format processor in a common format, the common format processor to receive a request to collect funds for a first amount associated with a phone number, to identify a plurality of controllers capable of transmitting a message to a mobile phone at the phone number, to determine costs that are charged to a mobile phone account associated with transmitting the message to the mobile phone via different paths through the controllers, select a least cost path among the paths, to select a first controller from the plurality of controllers based at least in part on reducing a cost that is charged to a mobile phone account associated with transmitting messages from the common format processor to a mobile device at the phone number, the common format processor to instruct the first controller of the controllers, via a first converter of the converters, to transmit a first message to the mobile device at the phone number to facilitate an online transaction related to funds associated with the phone number and collecting funds for the first amount in response to the message.

2. The system of claim 1, wherein the plurality of controllers include mobile carriers, aggregators and providers.

3. The system of claim 1, wherein the common format processor is configured to determine a path through the first controller that has a least cost, among the plurality of controllers, for transmitting the first message to the mobile device.

4. The system of claim 3, wherein the first message is a premium message; and the funds are collected at least in part via the premium message.

5. The system of claim 3, wherein the path includes more than one controller; and the least cost includes the cost for obtaining the funds from one source selected from a plurality of funding sources.

6. The system of claim 3, wherein the first message is a non-premium message sent to confirm the online transaction.

7. The system of claim 1, wherein the first message is to confirm a first user request to deposit a first amount of funds into the account associated with the phone number.

8. The system of claim 7, wherein responsive to a reply to the first message, the common format processor is to calculate a set of premium messages to charge the first amount and to instruct the first controller, via the first converter, to transmit the set of premium messages to the mobile device at the phone number to bill the first amount to the mobile account.

9. The system of claim 8, wherein after a telecommunication carrier of the mobile device deducts a portion from the first amount as a fee, the common format processor is to credit the account a second amount more than a portion of the first amount received from the interchange.

10. The system of claim 9, wherein the second amount is equal to the first amount.

11. The system of claim 8, wherein the common format processor includes a decision engine to calculate the set of premium messages based on a set of predetermined constraints.

12. The system of claim 8, wherein the common format processor further includes a mobile message generator to generate the first message and the set of premium messages.

13. The system of claim 8, wherein the common format processor is to select the first controller to minimize a cost for transmitting the set of premium messages that is charged to the mobile phone account.

14. The system of claim 7, wherein responsive to a reply to the first message, the common format processor is to select a second controller different from the first controller and to calculate a set of premium messages to charge the first amount and to instruct the second controller, via one of the plurality of converters, to transmit the set of premium messages to the mobile device at the phone number to bill the first amount to the mobile phone account.

15. The system of claim 1, wherein the first message is transmitted via short message service (SMS).

16. The system of claim 15, wherein the mobile device comprises a cellular phone.

17. The system of claim 1, wherein the funds are collected via at least one of: a credit card of the user, a debit card of the user, a bank account of the user, and an account identified by an email address of the user.

18. The system of claim 1, wherein the first message is to confirm a payment using the funds for a purchase made on a user terminal separate from the mobile device.

19. A computer-implemented method, comprising:
- receiving, in a computer, a request to collect funds for a first amount associated with a phone number;
- identifying, by the computer, a plurality of controllers capable of transmitting a message to a mobile phone at the phone number;
- determining, by the computer, costs that are charged to a mobile phone account associated with transmitting the message to the mobile phone via different paths through the controllers;
- selecting, by the computer, a least cost path among the paths;
- transmitting, by the computer, the message to the mobile phone via the least cost path; and
- collecting, by the computer, funds for the first amount in response to the message.

20. A computer-readable media storing instructions, the instructions causing a computer to perform a method, the method comprising:
- receiving, in a computer, a request to collect funds for a first amount associated with a phone number;
- identifying, by the computer, a plurality of controllers capable of transmitting a message to a mobile phone at the phone number;
- determining, by the computer, costs that are charged to a mobile phone account associated with transmitting the message to the mobile phone via different paths through the controllers;
- selecting, by the computer, a least cost path among the paths;
- transmitting, by the computer, the message to the mobile phone via the least cost path; and
- collecting, by the computer, funds for the first amount in response to the message.

* * * * *